US007640089B2

(12) United States Patent
Deng et al.

(10) Patent No.: US 7,640,089 B2

(45) Date of Patent: Dec. 29, 2009

(54) VEHICLE-TRAILER STABILITY AND HANDLING PERFORMANCE IMPROVEMENT USING REAR-WHEEL STEERING CONTROL

(75) Inventors: Weiwen Deng, Rochester Hills, MI (US); Yong H. Lee, Troy, MI (US); Yuen-Kwok Chin, Troy, MI (US); David S. Rule, Waterford, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 951 days.

(21) Appl. No.: 11/100,016

(22) Filed: Apr. 6, 2005

(65) Prior Publication Data

US 2006/0229782 A1 Oct. 12, 2006

(51) Int. Cl.
*B62D 5/02* (2006.01)

(52) U.S. Cl. ........................................ 701/42; 180/446

(58) Field of Classification Search ............. 701/41–43; 180/441–446

See application file for complete search history.

(56) References Cited

U.S. PATENT DOCUMENTS 6,580,988 B2 6/2003 Lin et al.

7,269,489 B2 * 9/2007 Deng et al. .................. 701/41

7,359,778 B2 * 4/2008 Goto et al. .................... 701/41

2004/0002800 A1 1/2004 Grougan et al.

* cited by examiner

*Primary Examiner*—Richard M. Camby

(74) *Attorney, Agent, or Firm*—John A. Miller; Miller IP Group, PLC

(57) ABSTRACT

A vehicle steering control system for a vehicle/trailer combination that provides rear-wheel steering assist to improve the vehicle/trailer combination stability and handling performance. The control system provides an open-loop feed-forward control signal based on hand-wheel angle and vehicle speed. The control system includes a vehicle yaw rate command interpreter that provides a vehicle closed-loop feedback control signal based on the yaw rate of the vehicle, a trailer yaw rate command interpreter that provides a trailer closed-loop feedback control signal based on the yaw rate of the trailer, and a vehicle lateral acceleration command interpreter that provides a closed-loop feedback control signal based on the lateral acceleration of the vehicle. The closed-loop feedback signals are added together and then combined with the open-loop feed-forward control signal to provide the rear-wheel steering assist.

6 Claims, 3 Drawing Sheets

Controller 12 36 34 16 10 40 38 22 24 42 20 28 30 14 44 26

VEHICLE-TRAILER STABILITY AND HANDLING PERFORMANCE IMPROVEMENT USING REAR-WHEEL STEERING CONTROL

BACKGROUND OF THE INVENTION

1. Field of the Invention

This invention relates generally to automatic rear-wheel steering control for a vehicle/trailer combination and, more particularly, to automatic rear-wheel steering control for a vehicle/trailer combination that employs both feed-forward (open-loop) control and feedback (closed-loop) control, where the feedback control employs vehicle yaw rate, trailer yaw rate and vehicle lateral acceleration feedback to improve both vehicle and trailer stability and handling performance.

2. Discussion of the Related Art

It is known in the art to employ automatic rear-wheel vehicle steering based on vehicle dynamic information during a vehicle turn, or yaw. Active rear-wheel steering control can improve vehicle stability over a conventional vehicle having only two steerable front wheels. The rear-wheel steering control can be in-phase steering or out-of-phase steering. In-phase rear-wheel steering steers the rear wheels in the same direction as the front wheels, and is typically provided at higher vehicle speeds. Out-of-phase rear-wheel steering steers the rear wheels in an opposite direction as the front wheels to provide a tighter turning radius, and is typically provided at lower vehicle speeds.

Open-loop rear-wheel steering provides a certain amount of rear-wheel steering control depending on the amount of hand-wheel steering provided by the vehicle operator and the vehicle speed. It is known to provide closed-loop rear-wheel steering based on certain feedback signals in the event that the vehicle is not following the steering path requested by the vehicle operator. Closed-loop rear-wheel steering assist systems sense the actual vehicle yaw rate and the intended yaw rate, and generate an error signal that provides the steering control by the rear wheels if the vehicle yaw rate and the intended yaw rate are not the same.

Directional dynamics and stability have been a primary concern for vehicle/trailer combinations because of certain undesirable response properties for heavy trailers when traveling at high speeds and/or on low coefficient friction surfaces. The handling performance of a vehicle towing a trailer can also be deteriorated as a result of the adverse influence of the trailer dynamics and kinematics. Because the vehicle/trailer combination is a two pivot-connected unit, the trailer is more prone to instability, such as lateral swing or even a jackknife condition. The vehicle is more related to the handling performance because the vehicle operator typically perceives only the vehicle's dynamics.

Compared to the single-unit vehicle, the vehicle operator of a vehicle/trailer combination has an additional task of coping with trailer oscillation, possible instability and the path followed by the trailer. Sometimes, these conditions conflict with each other in control design, particularly for vehicles including automatic rear-wheel steering control. For example, control systems for vehicles including automatic rear-wheel steering control typically attempt to keep the vehicle side-slip zero at the vehicle's center of gravity. However, the center of gravity of the vehicle/trailer combination is different than the center of gravity of the vehicle. The balance between overall system stability and vehicle handling performance often becomes a compromise due to limited control channel availability. In addition, the vehicle/trailer combination has a higher order, and thus is more complex, which further makes the control design more complicated.

SUMMARY OF THE INVENTION

In accordance with the teachings of the present invention, a vehicle steering control system for a vehicle/trailer combination is disclosed that provides rear-wheel steering control to improve the vehicle/trailer combination stability and handling performance. The control system provides an open-loop feed-forward control signal based on hand-wheel angle and vehicle speed. The control system includes a vehicle yaw rate command interpreter, a trailer yaw rate command interpreter and a vehicle lateral acceleration command interpreter for closed-loop feedback control. The vehicle yaw rate command interpreter provides a vehicle closed-loop feedback control signal based on the yaw rate of the vehicle. The trailer yaw rate command interpreter provides a trailer closed-loop feedback control signal based on the yaw rate of the trailer. The vehicle lateral acceleration command interpreter provides a closed-loop feedback control signal based on the lateral acceleration of the vehicle. The closed-loop feedback signals are added together and then combined with the open-loop feed-forward control signal to provide the rear-wheel steering control.

Additional advantages and features of the present invention will become apparent from the following description and appended claims, taken in conjunction with the accompanying drawings.

DETAILED DESCRIPTION OF THE EMBODIMENTS

The following discussion of the embodiments of the invention directed to automatic rear-wheel steering control for a vehicle/trailer combination is merely exemplary in nature, and is in no way intended to limit the invention or its applications or uses.

Figure 1:
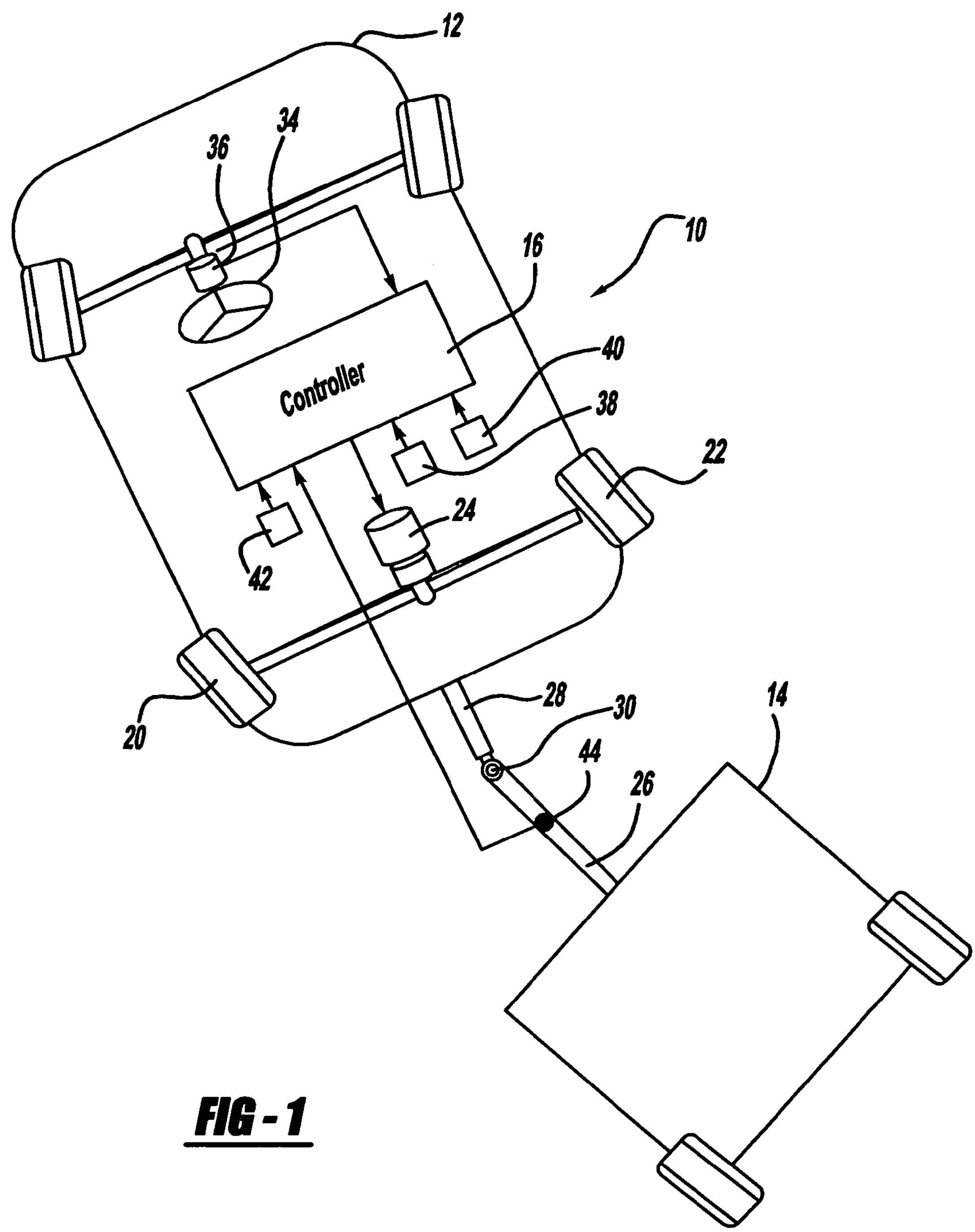
FIG. 1 is a plan view of a vehicle/trailer combination that includes a control system providing active rear-wheel steering, according to an embodiment of the present invention.

FIG. 1 is a plan view of a vehicle/trailer combination 10 including a vehicle 12 and a trailer 14. The vehicle 12 includes a controller 16 that provides automatic rear-wheel steering control to rear wheels 20 and 22 through an electric motor 24. As will be discussed in detail below, the controller 16 provides an open-loop feed-forward control and a closed-loop feedback control based on the yaw rate of the vehicle 12, the yaw rate of the trailer 14 and the lateral acceleration of the vehicle 12 for rear-wheel steering assist so that the vehicle operator only "feels" the vehicle 12 during a turn.

The trailer 14 includes a trailer hitch post 26 and the vehicle 12 includes a vehicle hitch post 28 including a hitch 30. The open-loop control in controller 16 attempts to provide zero side-slip at the hitch 30 to provide the vehicle stability and performance control of the invention.

The vehicle 12 includes a hand-wheel 34 and a hand-wheel position sensor 36 for measuring the angle of the hand-wheel 34 and providing a hand-wheel angle signal to the controller 16. The vehicle 12 further includes a vehicle speed sensor 38 for providing a vehicle speed signal to the controller 16 of the speed of the vehicle 12, a vehicle yaw rate sensor 40 for providing a vehicle yaw rate signal to the controller 16 of the yaw rate of the vehicle 12, and a vehicle lateral acceleration sensor 42 for providing a vehicle lateral acceleration signal to the controller 16 of the side-slip of the vehicle 12. Further, the trailer 14 includes a trailer yaw rate sensor 44 for providing a trailer yaw rate signal to the controller 16 of the yaw rate of the trailer 14. In this design, the trailer yaw rate sensor 44 is positioned within the hitch post 26, although this is by way of a non-limiting example. The various sensors discussed above can be any sensor that is suitable for the purpose discussed herein.

Figure 2:
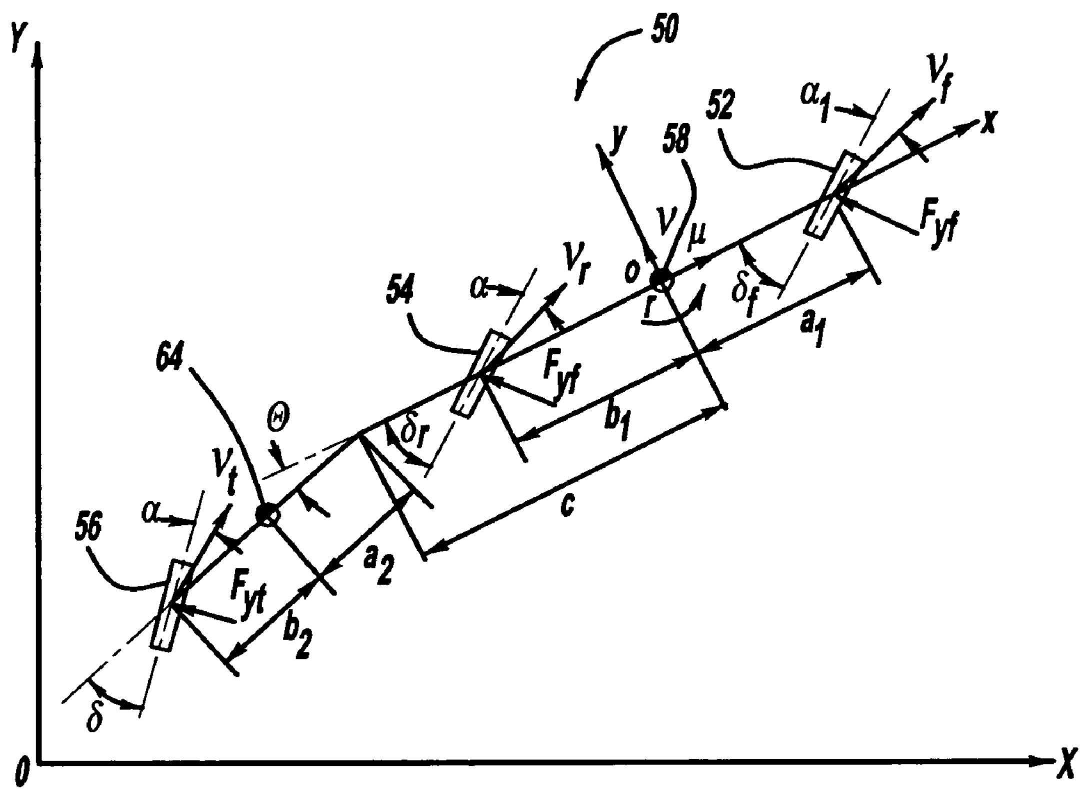
FIG. 2 is a tricycle model of a vehicle/trailer combination.

To calculate the closed-loop feedback control referred to above, the vehicle/trailer combination 10 is modeled as a tricycle model 50 as shown in FIG. 2, where wheel 52 represents the front wheels of the vehicle 12, wheel 54 represents the rear wheels 20 and 22 of the vehicle 12, wheel 56 represents the wheels of the trailer 14, point 58 is the center of gravity of the vehicle 12 and point 64 is the center of gravity of the trailer 14. The following nomenclature is used in the tricycle model 50 and the equations below.

$m_1$: mass of the vehicle 12;

$m_2$: mass of the trailer 14;

$I_{Z1}$: yaw moment of inertia of the vehicle 12;

$I_{Z2}$: yaw moment of inertia of the trailer 14;

$a_1$: distance from the center of gravity to the front axle of the vehicle 12;

$b_1$: distance from the center of gravity to the rear axle of the vehicle 12;

c: distance from the center of gravity of the vehicle 12 to the hitch point;

$a_2$: distance from the center of gravity of the trailer 14 to the hitch point;

$b_2$: distance from the center of gravity of the trailer 14 to the trailer axle;

$C_f$: concerning stiffness of the front wheels of the vehicle 12;

$C_r$: concerning stiffness of the rear wheels 20 and 22 of the vehicle 12;

$C_t$: concerning stiffness of the trailer wheels;

u: forward velocity of the vehicle 12;

v: side-slip velocity of the vehicle 12;

r: yaw rate of the vehicle 12;

θ: hitch angle;

$\delta_1$: steering angle of the front wheels of the vehicle 12;

$\delta_{f\_cmd}$: steering-wheel angle command from the vehicle operator;

$\delta_r$: steering angle of the rear wheels of the vehicle 12; and $\delta_t$: steering angle of the wheels of the trailer 14.

Based on the tricycle model 50, a model equation in linear form can be written as:

$$\begin{bmatrix} m_1+m_2 & -m_2(c+a_2) & -m_2a_2 & 0 \\ m_1c & I_{z1} & 0 & 0 \\ -m_2a_2 & I_{z2}+m_2a_2^2+m_2ca_2 & I_{z2}+m_2a_2^2 & 0 \\ 0 & 0 & 0 & 1 \end{bmatrix} \begin{bmatrix} \dot{v} \\ \dot{r} \\ \dot{\phi} \\ \dot{\theta} \end{bmatrix} = \tag{1}$$

$$\frac{1}{u}\begin{bmatrix} -(C_f+C_r+C_1) & -a_1C_f+b_1C_r+(c+a_2+b_2)C_t-(m_1+m_2)u^2 & (a_2+b_2)C_t & C_t \\ -(a_1+c)C_f+(b_1-c)C_r & -a_1(a_1+c)C_f+b_1(c-b_1)C_r-m_1cu^2 & 0 & 0 \\ (a_2+b_2)C_t & -(a_2+b_2)(c+a_2+b_2)C_t+m_2a_2u^2 & -(a_2+b_2)^2C_t & -(a_2+b_2)C_t \\ 0 & 0 & u & 0 \end{bmatrix}$$

$$\begin{bmatrix} \dot{v} \\ \dot{r} \\ \dot{\phi} \\ \dot{\theta} \end{bmatrix} + \begin{bmatrix} C_f & C_r \\ (a_1+c)C_f & (c-b_1)C_r \\ 0 & 0 \\ 0 & 0 \end{bmatrix} \begin{bmatrix} \delta_f \\ \delta_{r\_ff} \end{bmatrix}$$

Equation (1) can be simplified as:

$$M\dot{X} = A_0 \cdot X + [\,B_{01} \quad B_{02}\,] \cdot \begin{bmatrix} \delta_f \\ \delta_{r\_ff} \end{bmatrix} \tag{2}$$

Equation (2) can be written in space form as:

$$\dot{X}=A \cdot X+B_1\delta_f+B_2\delta_{r\_ff} \tag{3}$$

Where the open-loop command signal $\delta_{r\_ff}=K_f(u)\delta_{f\_cmd}$. Further, with feedback control, the state-space equation can be written as:

$$\begin{aligned} \dot{X} &= A \cdot X + (B_1 + B_2K_f) \cdot \delta_f + E \cdot \delta_{r\_fb} \\ &= A \cdot X + B \cdot \delta_f + E \cdot \delta_{r\_fb} \end{aligned} \tag{4}$$

The feed-forward rear-front (R/F) ratio $K_f(u)$ is determined based on the criteria of zero lateral speed at the hitch 30 with respect to the vehicle 12. This kinematically minimizes the coupling between the vehicle 12 and the trailer 14, and thus minimizes the adverse lateral motion influence between the vehicle 12 and the trailer 14. The lateral velocity v at the hitch 30 is given as:

$$v_{yh}=V-rc \tag{5}$$

The feed-forward R/F ratio $K_f(u)$ can be determined by letting $\dot{X}=0$ and $v_{yh}=0$ from equation (4).

The controller 16 includes a vehicle acceleration command interpreter, discussed below, that determines a vehicle lateral acceleration closed-loop feedback control signal that minimizes the dynamic coupling between the vehicle 12 and the trailer 14 to maintain the total velocity of the trailer 14 at the hitch 30 in line with the longitudinal axis of the trailer 14, or to maintain zero lateral vehicle acceleration at the hitch 30 with respect to the trailer, where:

$$v_{th}\cos\theta = u \quad (6)$$

$$v_{th}\sin\theta = v_{yh} \quad (7)$$

This leads to:

$$v = u\tan\theta + rc \quad (8)$$

Assuming a constant vehicle speed u and a small hitch angle θ, the derivative of the lateral velocity v (lateral acceleration) is given as:

$$\begin{aligned}\dot{v} &= u(\tan\dot{\theta}) + \dot{r}c \\ &= u(1+\tan^2\theta)\dot{\theta} + c\dot{r} \\ &= u(1+\theta^2)\dot{\theta} + c\dot{r} \\ &\approx u\dot{\theta} + c\dot{r}\end{aligned} \quad (9)$$

Because $\dot{\theta} = r - r_t$, then:

$$\dot{v} = u(r_t - r) + \dot{r}c \quad (10)$$

Further:

$$\dot{v} = A_y - ur \quad (11)$$

$$\begin{aligned}A_y &= u(r_t - r) + c\dot{r} + ur \\ &= ur_t + c\dot{r}\end{aligned} \quad (12)$$

Thus, the lateral acceleration feedback command $A_{y\_cmd}$ can be derived as:

$$A_{y\_cmd} = ur_{t\_cmd} + c\dot{r}_{cmd} \quad (13)$$

The controller 16 also includes a vehicle yaw rate command interpreter, discussed below, that determines a closed-loop vehicle yaw rate command signal. Due to the high order of the vehicle/trailer model, the present invention provides a simplified technique for determining the vehicle yaw rate command. Particularly, the vehicle yaw rate command includes two terms as a steady-state value derived from equation (3) with $\dot{X}=0$, i.e., the vehicle yaw rate steady-state value, and a second-order dynamic filter based on a second-order bicycle model of the vehicle 12 without the trailer 14.

From equation (3); let $\dot{X} = A\cdot X + B_1\delta_f + B_2\delta_{r\_ff} = 0$. The vehicle yaw rate steady-state value is then derived as $r_{ss}$. The vehicle dynamic yaw rate command signal can therefore be derived with a second-order filter as:

$$\Omega_{cmd}(s) = \frac{\omega_n^2}{s^2 + 2\xi\omega_n s + \omega_n^2} r_{ss} \quad (14)$$

Where $\omega_n$ is the un-damped natural frequency and ξ is the damping ratio, and where both values can be derived from a second-order bicycle model of the vehicle 12 without the trailer 14 as:

$$\dot{v} = a_{11}v + a_{12}r + b_{11}\delta_f + b_{12}\delta_{r\_ff} \quad (15)$$

$$\dot{r} = a_{21}v + a_{22}r + b_{21}\delta_f + b_{22}\delta_{r\_ff} \quad (16)$$

Where $\delta_f$ and $\delta_{r\_ff}$ are the front and rear-wheel steering inputs, respectively, and:

$$a_{11} = -\frac{C_f + C_r}{m_1 u} \quad (17)$$

$$a_{12} = \frac{-C_f a_1 + C_r b_1}{m_1 u} - u \quad (18)$$

$$a_{21} = \frac{-C_f a_1 + C_r b_1}{I_{z1} u} \quad (19)$$

$$a_{22} = -\frac{C_f a_1^2 + C_r b_1^2}{I_{z1} u} \quad (20)$$

$$b_{11} = \frac{C_f}{m_1} \quad (21)$$

$$b_{21} = \frac{a_1 C_f}{I_{z1}} \quad (22)$$

$$b_{12} = \frac{C_r}{m_1} \quad (23)$$

$$b_{22} = \frac{b_1 C_r}{I_{z1}} \quad (24)$$

By taking the Laplace transform of the linear state equations (15) and (16), the linear vehicle model can be described in terms of velocity-dependent transfer functions between the steering input δ, the lateral acceleration v and the vehicle yaw rate r as:

$$\frac{V(s)}{\delta(s)} = \frac{b_{11}s + [a_{12}b_{21} - a_{22}b_{11}]}{s^2 - [a_{11} + a_{22}]s + [a_{11}a_{22} - a_{12}a_{21}]} \quad (25)$$

$$\frac{\Omega(s)}{\delta(s)} = \frac{b_{21}s + [-a_{11}b_{21} - a_{21}b_{11}]}{s^2 - [a_{11} + a_{22}]s + [a_{11}a_{22} - a_{12}a_{21}]} \quad (26)$$

Both transfer functions have the same second-order characteristic equation as:

$$s^2 + 2\xi\omega_n s + \omega_n^2 = 0 \quad (27)$$

With:

$$2\xi\omega_n = -(a_{11} + a_{22}) = \frac{C_f + C_r}{m_1 u} + \frac{C_f a_1^2 + C_r b_1^2}{I_{z1} u} \quad (28)$$

$$\omega_n^2 = a_{11}a_{22} - a_{12}a_{21} = \frac{C_f C_r (a_1 + b_1)^2}{m_1 I_{z1} u^2} + \frac{C_r b_1 - C_f a_1}{I_{z1}} \quad (29)$$

Therefore, the un-damped natural frequency $\omega_n$ and the damping ratio ξ are given as:

$$\omega_n = \sqrt{\frac{C_f C_r (a_1 + b_1)^2}{m_1 I_{z1} u^2} + \frac{C_r b_1 - C_f a_1}{I_{z1}}} \quad (30)$$

-continued $$\xi = \frac{\sqrt{\frac{C_f + C_r}{m_1} + \frac{C_f a_1^2 + C_r b_1^2}{I_{z1}}}}{2\sqrt{\frac{C_f C_r (a_1 + b_1)}{m_1 I_{z1}} + \frac{C_r b_1 - C_f a_1}{I_{z1}} u^2}} \tag{31}$$

This derivation maintains the steady-state performance of the vehicle/trailer combination 10, improves the vehicle dynamic response during its transient state to be more vehicle-like, and simplifies the on-board computation without computing a fourth-order derivative equation.

The controller 16 also includes a trailer yaw rate command interpreter, discussed below, that determines a closed-loop trailer yaw rate command signal. To avoid the higher-order model, the trailer yaw rate command is comprised of the steady-state value of the trailer yaw rate derived from equation (3), with $\dot{X}=0$, and a second-order dynamic filter as:

$$\Omega_{2cmd}(s) = \frac{\omega_{n2}^2}{s^2 + 2\xi\omega_{n2}s + \omega_{n2}^2} r_{2ss} \tag{32}$$

Figure 3:
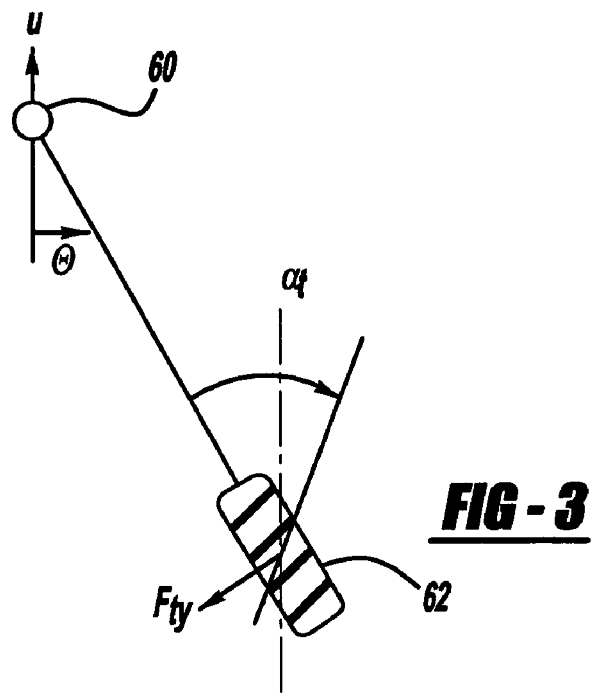
FIG. 3 is an illustration of the trailer of the vehicle/trailer combination showing that the trailer operates as a pendulum-like system.

The trailer's un-damped natural frequency $\omega_{n2}$ and damping ratio $\xi_2$ can be derived from a second-order model, which approximates the trailer 14 alone as a pendulum. FIG. 3 is a pendulum illustration where point 60 represents the hitch 30 and wheel 62 represents the trailer's wheels.

The trailer wheel slip angle at is approximated as:

$$\tan^{-1}\left(\frac{v_{ty}}{u}\right) \approx \frac{\dot{\theta}(a_2 + b_2)}{u} \tag{33}$$

$$\alpha_t \approx \theta + \tan^{-1}\left(\frac{v_{ty}}{u}\right) \tag{34}$$

$$\alpha_t \approx \theta + \frac{\dot{\theta}(a_2 + b_2)}{u} \tag{35}$$

Thus, the trailer wheel lateral force is $F_{ty}=C_t\alpha_t$. By letting $L_2=a_2+b_2$, and from Newton's law, the system equation can be derived as:

$$I_{z2}\ddot{\theta} + \frac{L_2^2}{u} C_t \dot{\theta} + L_2 C_t \theta = 0 \tag{36}$$

A standard second-order form of equation (36) is given as:

$$\ddot{\theta}+2\xi_2\omega_{n2}\dot{\theta}+\omega_{n2}^2\theta=0 \tag{37}$$

Where $\omega_{n2}$ is the trailer un-damped natural frequency and $\xi_2$ is the trailer damping ratio as:

$$\omega_{n2} = \sqrt{\frac{C_t L_2}{I_{z2}}} \tag{38}$$

$$\xi_2 = \frac{L_2}{2u}\sqrt{\frac{C_t L_2}{I_{z2}}} \tag{39}$$

Figure 4:
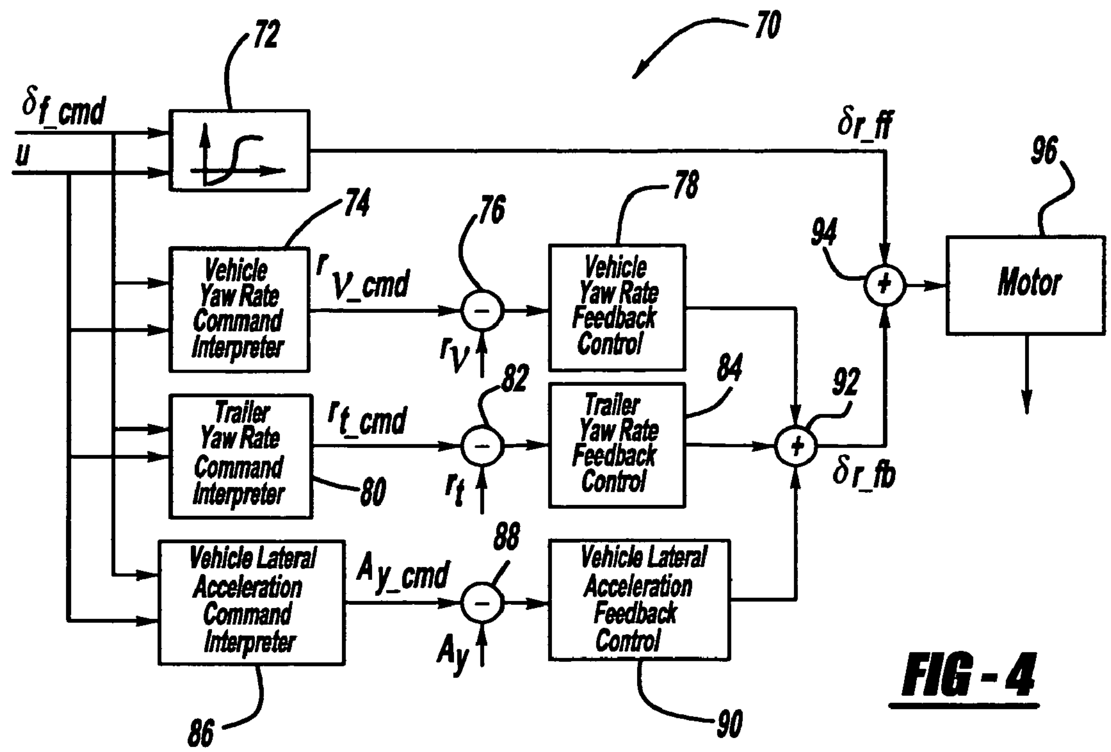
FIG. 4 is a block diagram showing the open-loop feed-forward control and the closed-loop feedback control for the control system shown in FIG. 1.

FIG. 4 is a schematic block diagram of a control system 70 used in the controller 16 for generating the rear-wheel steering command signal applied to the electric motor 24. The hand-wheel angle signal $\delta_{f\_cmd}$ from the sensor 36 and the vehicle speed signal u from the vehicle speed sensor 38 are applied to an open-loop lookup table 72 to generate the open-loop command signal $\delta_{r\_ff}$. The look-up table 72 determines the feed-forward R/F ratio $K_f(u)$ based on the vehicle speed signal u, and then multiplies the ratio $K_f(u)$ by the front wheel steering angle to provide the desired feed-forward rear-wheel steering angle $\delta_{r\_ff}$. As discussed above, the feed-forward R/F ratio $K_f(u)$ is determined based on zero lateral acceleration at the hitch 30 based on the equations (1)-(5).

The control system 70 includes a vehicle yaw rate command interpreter 74 that also receives the vehicle speed signal u and the steering wheel angle command signal $\delta_{f\_cmd}$. The vehicle yaw rate command interpreter 74 calculates the vehicle yaw rate command signal $\Omega_{cmd}(s)$ from equations (14)-(29). As discussed above, the vehicle's un-damped natural frequency $\omega_n$ from equation (30) and the damping ratio $\xi$ from equation (31) are determined from a second-order model. The vehicle dynamic yaw rate command signal $\Omega_{cmd}$ (s) is in the frequency domain, which is converted by the command interpreter 74 to a steady-state command signal $r_{v\_cmd}$ by taking the derivative of the frequency signal. The vehicle yaw rate command signal $r_{v\_cmd}$ and the measured vehicle yaw rate signal r from the vehicle yaw rate sensor 40 are applied to a differencer 76 to generate a vehicle yaw rate error signal between the vehicle yaw rate command signal $r_{v\_cmd}$ and the vehicle yaw rate signal r.

The vehicle yaw rate error signal is applied to a vehicle yaw rate feedback controller 78 that generates a vehicle yaw rate steering control signal based on the vehicle yaw rate error signal. The feedback controller 78 can be any controller suitable for the purposes described herein, such as a proportional-integral-derivative (PID) controller, well known to those skilled in the art. If the vehicle yaw rate error signal is not large enough, the system 70 does not provide vehicle yaw rate feedback.

The hand-wheel angle signal $\delta_{r\_cmd}$ and the vehicle speed signal u are also applied to a trailer yaw rate command interpreter 80. The trailer yaw rate command interpreter 80 generates the trailer yaw rate command signal $\Omega_{2cmd}(s)$ from equations (32)-(37) that is also in the frequency domain. As discussed above, the trailer's un-damped natural frequency $\omega_{n2}$ from equation (38) and the damping ratio $\xi_2$ from equation (39) are determined from a second-order model that approximates the trailer 14 as a pendulum. The trailer yaw rate command interpreter 80 takes the derivative of the trailer yaw rate command signal $\Omega_{2cmd}(s)$ to generate a steady-state trailer yaw rate command signal $r_{t\_cmd}$.

The steady-state trailer yaw rate command signal $r_{t\_cmd}$ is applied to a differencer 82 along with the measured trailer yaw rate signal $r_t$ from the trailer yaw rate sensor 44. The differencer 82 generates a trailer yaw rate error signal that is applied to a trailer yaw rate feedback controller 84, such as a PID controller. If the trailer yaw rate error signal is not large enough, the system 70 does not provide trailer yaw rate feedback. The trailer yaw rate feedback controller 84 generates a trailer yaw rate closed-loop steering control signal.

The system 70 also includes a vehicle lateral acceleration command interpreter 86 that receives the hand-wheel angle signal $\delta_{r\_cmd}$ and the vehicle speed signal u, and generates a lateral acceleration command signal $A_{y\_cmd}$ from equation (13). The vehicle lateral acceleration signal $A_{y\_cmd}$ is applied to a differencer 88 along with the measured vehicle lateral acceleration signal $A_y$ from the vehicle acceleration sensor 42 to generate a lateral acceleration error signal. The lateral acceleration error signal is applied to a vehicle lateral acceleration feedback controller 90, such as a PID controller, that generates a closed-loop vehicle lateral acceleration steering assist control signal. If the lateral acceleration error signal is not large enough, the system 70 does not provide trailer yaw rate feedback.

The control signals from the controllers 78, 84 and 90 are applied to an adder 92 that generates a combined closed-loop feedback steering command signal $\delta_{r\_fb}$. The open-loop steering command signal $\delta_{r\_ff}$ and the closed-loop steering command signal $\delta_{r\_fb}$ are applied to an adder 94 that adds the signals together to generate a combined open-loop and closed-loop steering command signal that is applied to an electric motor 96 for providing a steering command signal to the rear wheels 20 and 22 of the vehicle 12.

Figure 5:
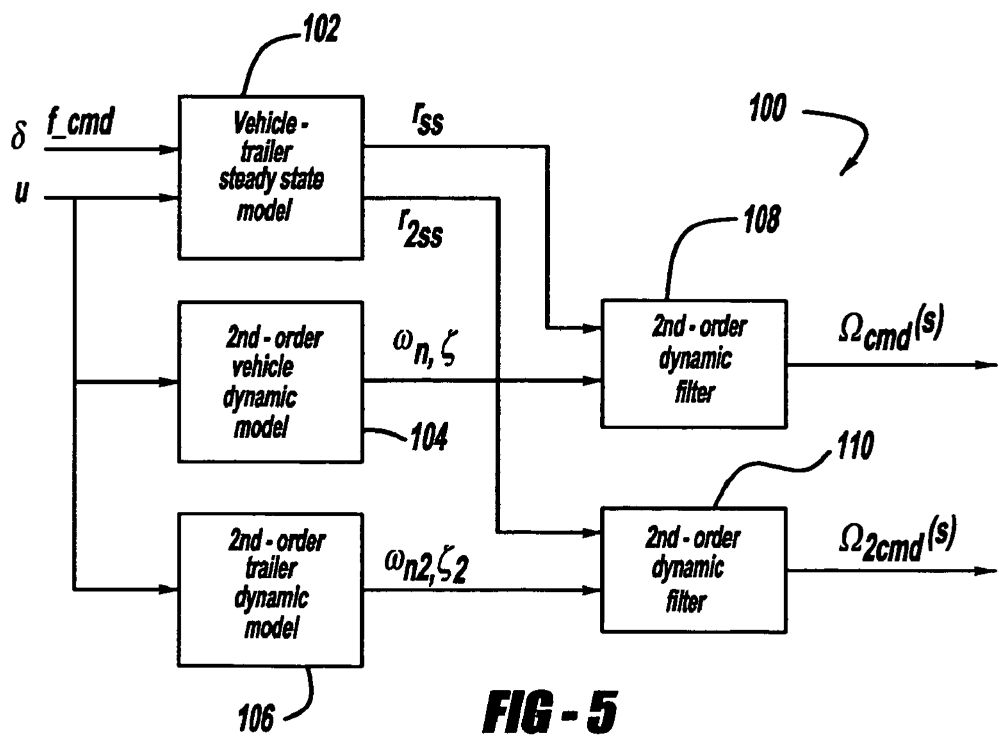
FIG. 5 is a detailed block diagram showing the closed-loop feedback control for the vehicle yaw rate and the trailer yaw rate.

FIG. 5 is a block diagram 100 showing a more detailed system for generating the vehicle yaw rate command signal $\Omega_{cmd}(s)$ from equation (14) in the command interpreter 74 and the trailer yaw rate command signal $\Omega_{2cmd}(s)$ from equation (32) in the command interpreter 80. Particularly, the hand-wheel angle signal $\delta_{r\_cmd}$ and the vehicle speed signal u are applied to a vehicle-trailer steady-state model process block 102, a second-order vehicle dynamic model process block 104 and a second-order trailer dynamic model process block 106.

The process block 102 uses equation (1), where $\dot{X}=0$, and generates the vehicle steady-state yaw rate signal $r_{ss}$ and the trailer steady-state yaw rate signal $r_{2ss}$, as discussed above. The second-order vehicle dynamic model process block 104 generates the un-damped natural frequency $\omega_n$ and the damping ratio $\xi$ from equations (30) and (31), respectively, for the vehicle 12. The second-order trailer dynamic model process block 106 generates the un-damped natural frequency $\omega_{n2}$ and the damping ratio $\xi_2$ from equations (38) and (39), respectively, for the trailer 14. The vehicle signals from the process blocks 102 and 104 are applied to a second-order dynamic filter 108 that generates the vehicle yaw rate command signal $\Omega_{cmd}(s)$ from equation (14). The trailer signals from the process blocks 102 and 106 are applied to a second-order dynamic filter 110 that generates the trailer yaw rate command signal $\Omega_{cmd}(s)$ from equation (32).

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A control system for providing a rear-wheel steering assist signal for rear wheels on a vehicle, said system comprising:

a hand-wheel sensor for providing a hand-wheel angle signal of the position of a vehicle hand-wheel;

a vehicle speed sensor for providing a vehicle speed signal of the speed of the vehicle;

a vehicle yaw rate sensor for providing a measured vehicle yaw rate signal of the yaw rate of the vehicle;

a vehicle yaw rate command interpreter responsive to the hand-wheel angle signal and the vehicle speed signal, said vehicle yaw rate command interpreter generating a vehicle yaw rate command signal;

a differencer responsive to the vehicle yaw rate command signal and the measured vehicle yaw rate signal, said differencer generating a vehicle yaw rate error signal; and a vehicle yaw rate feedback controller responsive to the vehicle yaw rate error signal, said vehicle yaw rate feedback controller generating a vehicle yaw rate feedback signal for the rear-wheel steering assist signal.

2. The system according to claim 1 wherein the vehicle yaw rate feedback controller is a proportional-integral-derivative (PID) controller.

3. The system according to claim 1 wherein the system attempts to maintain a zero side-slip at a hitch point between the vehicle and a trailer.

4. The system according to claim 1 wherein vehicle yaw rate command interpreter derives a vehicle un-damped natural frequency and vehicle damping ratio from a second-order model.

5. The system according to claim 1 wherein the vehicle yaw rate command interpreter generates a vehicle steady-state signal used for calculating the vehicle yaw rate command signal.

6. The system according to claim 5 wherein the vehicle yaw rate command interpreter includes a second-order filter that is responsive to the vehicle steady-state signal, a vehicle un-damped natural frequency and a vehicle damping ratio that are used for calculating the vehicle yaw rate command signal.

* * * * *